US006701284B1

(12) United States Patent
Huntley et al.

(10) Patent No.: US 6,701,284 B1
(45) Date of Patent: Mar. 2, 2004

(54) METHODS AND APPARATUS FOR MAINTAINING A PROGRAMMABLE LOGIC CONTROL REVISION HISTORY

(75) Inventors: William M. Huntley, Earlysville, VA (US); Stephen A. Hogge, Charlottesville, VA (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 0 days.

(21) Appl. No.: 09/233,713

(22) Filed: Jan. 19, 1999

Related U.S. Application Data

(60) Provisional application No. 60/082,266, filed on Apr. 17, 1998.

(51) Int. Cl.[7] .......................... G06F 15/00; G06F 17/40
(52) U.S. Cl. ..................................................... 702/187
(58) Field of Search ..................... 702/187, 79; 700/9, 700/87, 18; 707/1–5, 203, 200, 201, 202, 204; 717/110, 125–127, 168–178

(56) References Cited

U.S. PATENT DOCUMENTS

| | | | | |
|---|---|---|---|---|
| 4,266,281 A | * | 5/1981 | Struger et al. ................ 700/83 |
| 4,851,985 A | * | 7/1989 | Burror et al. ................. 700/79 |
| 4,908,746 A | * | 3/1990 | Vaughn ....................... 700/18 |
| 5,062,045 A | * | 10/1991 | Janis et al. ..................... 707/9 |
| 5,062,052 A | * | 10/1991 | Sparer et al. ............... 700/197 |
| 5,119,493 A | * | 6/1992 | Janis et al. ..................... 717/4 |
| 5,127,099 A | * | 6/1992 | Zifferer et al. ............. 340/5.22 |
| 5,455,505 A | * | 10/1995 | Laplace et al. ............. 323/343 |
| 5,781,776 A | * | 7/1998 | Johnston et al. ............ 717/130 |
| 5,784,552 A | * | 7/1998 | Bishop et al. ................ 714/38 |
| 5,935,099 A | * | 8/1999 | Peterson et al. .............. 604/65 |
| 5,940,628 A | * | 8/1999 | Seno ........................... 710/59 |
| 6,131,066 A | * | 10/2000 | Ahrens et al. .............. 701/200 |
| 6,381,501 B1 | * | 4/2002 | Takase ........................... 700/2 |

\* cited by examiner

*Primary Examiner*—John Barlow
*Assistant Examiner*—Demetrius Pretlow
(74) *Attorney, Agent, or Firm*—Karl A. Vick, Esq.; Armstrong Teasdale LLP

(57) ABSTRACT

Methods and apparatus for maintaining a PLC revision history are described. In one embodiment, the PLC creates and maintains a revision history log that provides information related to changes made to the PLC user program and/or the PLC configuration. If a change is detected, information regarding the change is gathered and stored in the history log. The history log maintains a record of the revisions made to the PLC. If the history log becomes full, the oldest revision entry is deleted and the latest change is incorporated into the history log.

17 Claims, 2 Drawing Sheets

METHODS AND APPARATUS FOR MAINTAINING A PROGRAMMABLE LOGIC CONTROL REVISION HISTORY

CROSS REFERENCE TO RELATED APPLICATION

This application claims the benefit of U.S. Provisional Application No. 60/082,266, filed Apr. 17, 1998.

FIELD OF THE INVENTION

This invention relates generally to programmable logic controllers (PLCs) and, more particularly, to an algorithm for maintaining a PLC revision history.

BACKGROUND OF THE INVENTION

Known programmable logic controllers are extensively used in process control applications. As a part of process control, the programmable logic controller is used to monitor input signals from a variety of inputs which report events and conditions occurring in a controlled process. For example, a PLC can monitor such input conditions as motor speed, temperature, pressure, volumetric flow, as well as other conditions. A user program is stored in a memory within the PLC to instruct the PLC what actions to take upon encountering particular input signals or conditions. In response to the input signals, the PLC derives and generates output signals which are transmitted to various output devices to control the process. For example, based on the input signals, the PLC issues output signals to speed up or slow down a motor, open or close a relay, raise or lower temperature or adjust pressure as well as many possible control functions.

A typical PLC includes at least one Input/Output (I/O) module. Each I/O module has a plurality of input/output points. The I/O modules are coupled through an interface bus, for example via a backplane, to a processor in the PLC. The particular processor used in the PLC together with the particular choice of I/O modules installed are often referred to as the hardware configuration of the PLC. The hardware configuration also includes the particular addresses which the I/O modules employ.

Many revisions and changes typically are made to the PLC during product development and throughout the life cycle of the product. These changes are the result of corrections to the user program, modifications related to the input/output signals and replacement of the I/O modules. Each change, however, creates the possibility of altering the control process. As a result, in certain applications, each alteration is required to be recorded and tracked. For example, some regulatory bodies, e.g., the Food and Drug Administration (FDA), require the tracking of changes made to the PLC system. Customers also sometimes require tracking field changes made to the PLC by end users. Therefore, tracking of these changes and the ability to reproduce a previous configuration at will is critical to successful project management.

It is desirable to provide apparatus and methods for creating and maintaining a history log indicative of changes made to the PLC user program and the PLC hardware configuration. It also would be desirable to automatically detect a change in the configuration and modify the history log to reflect the change.

SUMMARY OF THE INVENTION

These and other objects may be attained by a system which facilitates maintaining a history of changes to a PLC user program and to PLC hardware configuration. More particularly and in one embodiment, the system detects changes in the PLC user program and/or in the PLC hardware configuration. If a change is detected, information is gathered that reflects the name of or identification number of the person making the change, the time of the change, whether the user program or hardware configuration, or both, are being changed, and comment information. This information is stored in the PLC memory as a history log.

In one embodiment, the history log includes information from the previous twenty changes. If inadequate space exists to store the latest revision in the history log, the oldest change information is deleted and the latest change information is added.

The revision history system described above maintains a history log indicative of revisions made to the PLC control program and the hardware configuration. The system also maintains specific information related to the revision.

DETAILED DESCRIPTION

Figure 1:
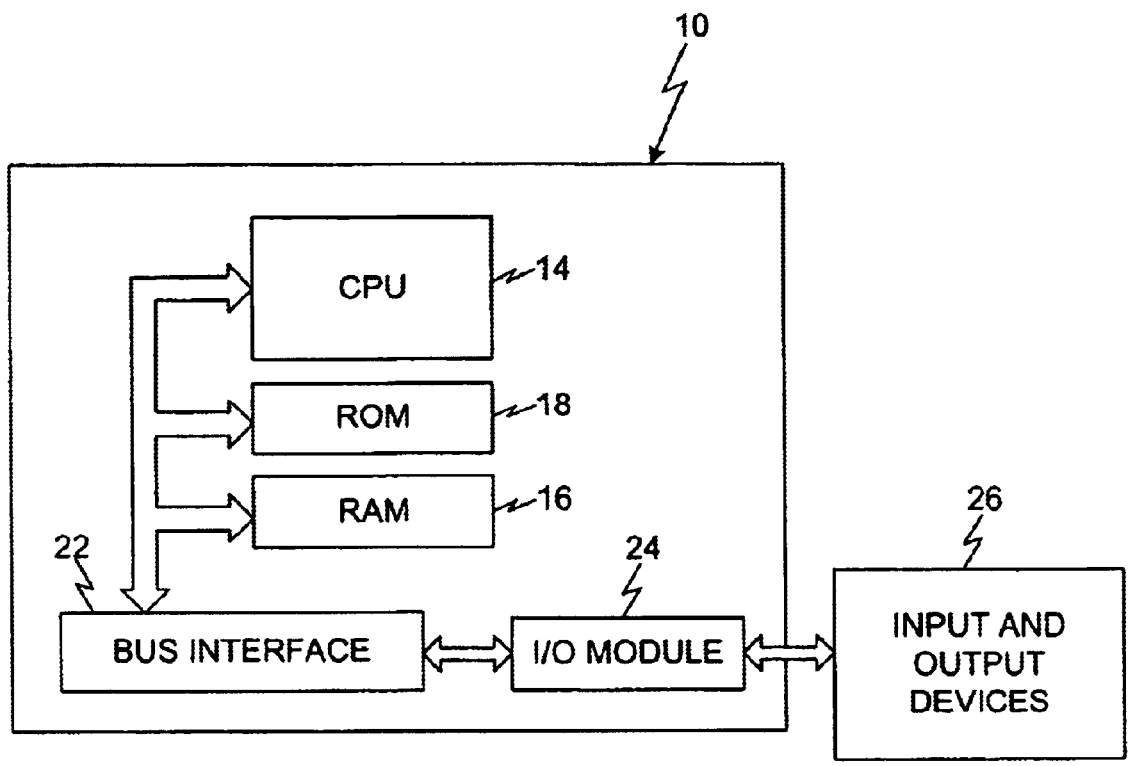
FIG. 1 is a block diagram of a PLC revision history system in accordance with one embodiment of the present invention.

FIG. 1 is a block diagram of a PLC 10 according to one embodiment of the present invention. PLC 10 includes a central processing unit (CPU) 14, a random access memory (RAM) 16, a read only memory (ROM) 18, a bus interface 22, and a module 24, for example a Input/Output Module (I/O Module). Although only one module 24 is shown in FIG. 1, PLC 10 may include multiple I/O modules 24, for example, an I/O module for interfacing to a motor, or an Input/Output module for receiving various input signals from devices, i.e., a switch (not shown). Modules 24 are coupled to input and output devices 26.

A user program is stored in RAM 16. The user program controls operation of CPU 14 so that based at least in part on inputs from modules 24, appropriate outputs are generated. During the product development and throughout the life cycle many revisions and changes are made to PLC 10. These changes include corrections to the user program and changes in I/O modules 24. Each of these changes, however, create the possibility of altering the control process. In order to reproduce previous configurations, it is desirable to create and maintain a revision history indicative of the changes made to PLC 10.

To maintain the revision history, and in one embodiment, a history log algorithm is loaded into PLC 10. Specifically, the algorithm is loaded, and stored, in ROM 18. The algorithm is then executed by CPU 14.

Figure 2:
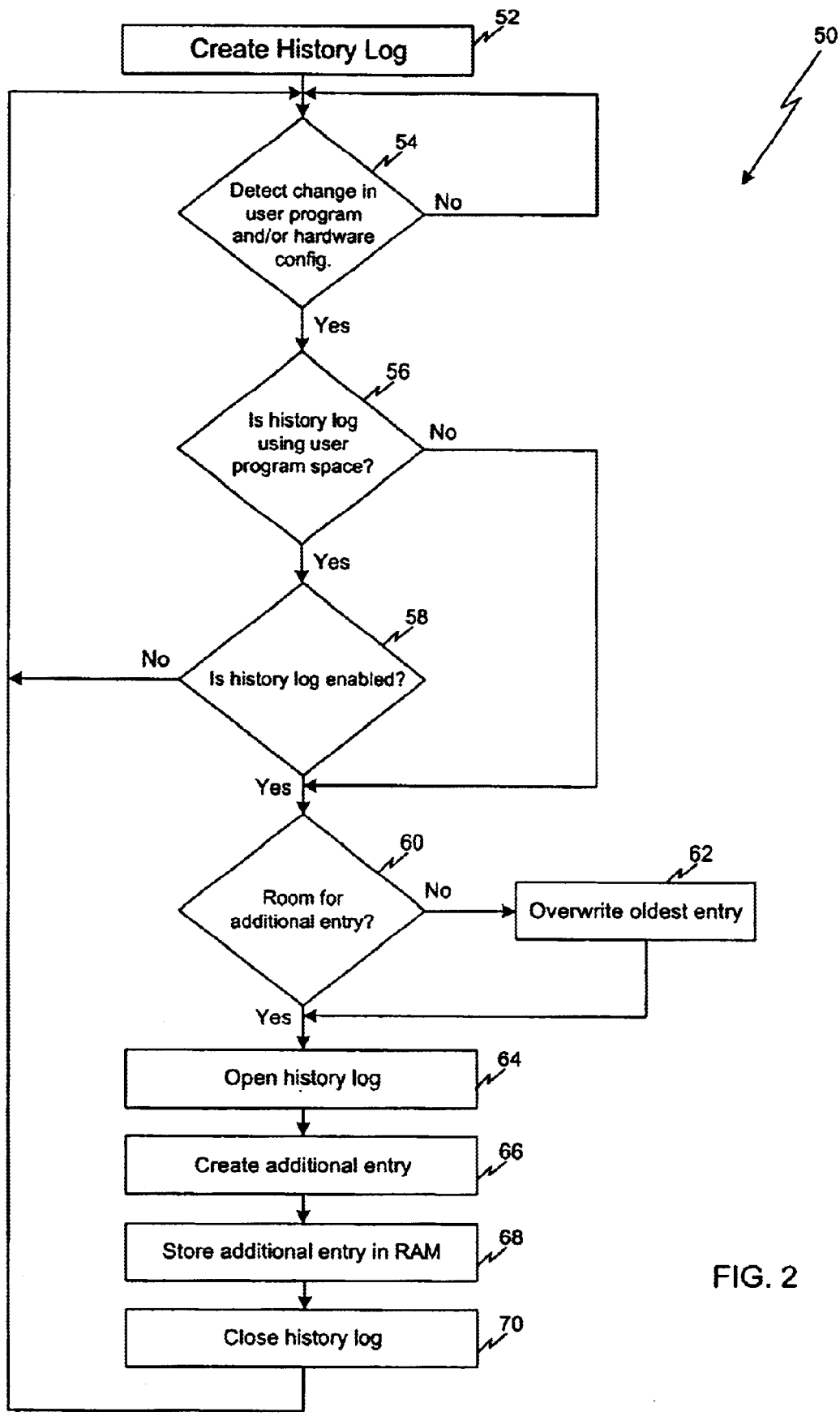
FIG. 2 is flow diagram illustrating operation of the system in accordance with one embodiment of the present invention.

A flow chart 50 illustrating process steps executed by CPU 14 in creating and maintaining the history log is set forth in FIG. 2. More particularly, and after PLC 10 has been configured and the user program has been stored in RAM 16, CPU 14 is instructed to create the history log 52. In one embodiment, the history log includes at least one entry and each entry includes the name or identification number (ID) of the person making the change, the time of the change, including the date, hour, minute, seconds, the type of change, the program name, and a comment field. The type of change field identifies whether the program, configuration, or both were changed. The history log may contain additional information as required for the specific application. The history log is stored in designated memory locations in RAM 16.

After the history file has been created 52, CPU 14 monitors operations to detect a change 54 in the user program or the hardware configuration. Particularly, CPU 14 detects any modifications to the contents of RAM 16 and the hardware configuration of PLC 10, e.g., adding or removing a module 24. For example, the user program may be modified using a programmer connected to PLC bus interface 22. The programmer sends the appropriate programming commands to CPU 14 to change the user program stored in RAM 16. The hardware configuration may be changed by modifying the address, or type, of I/O module 24.

After detecting a change 54, CPU 14 determines 56 whether the history log is stored in pre-designated user program storage space. As explained above, both the history log and the user program are stored in RAM 16. In such a configuration, updating of the history log may be disabled 58 to maximize the space available for the user program. If the history log is sharing space with the user program and the history log is disabled 58, the history log will not be updated upon detection of a change. If, however, the history log is enabled 58 or the history log is not stored in the user program storage space 56, the history log will be updated each time a revision is detected in the user program or the hardware configuration.

For example, if the user program and the history log are stored in RAM 16, CPU 14 examines a history log signal or flag, to determine if the history log is enabled 58. If the history log signal is false, the history log will not be updated. If, however, the history log signal is true, the history log will be updated.

In an alternative embodiment, RAM 16 includes two separate portions of RAM, including a portion of RAM used for storage of the user program, and a portion of RAM used for storage of the history log. For example, RAM 16 may include two separate devices. One device is used for storage of the user program, such as FLASH, and the second device could be non-volatile RAM for storage of the history log. The non-volatile RAM allows the history log to be maintained despite removal of power to PLC 10. In this configuration, CPU 14 determines 56 that the history log will not share the user program space. As a result, the history log will be updated.

After determining that the history log should be updated, the amount of space available for the history log is examined by CPU 14 to determine 60 if adequate space is available for an additional entry. If additional space is unavailable, space must be made available for the entry. In one embodiment, the history log acts as circular queue so that after the space that has been designated for the history log becomes full, CPU 14 over-writes 62 the oldest entry to with the additional entry.

For example, in one embodiment, RAM 16 is configured, to include adequate bytes, or spaces, to store twenty entries. If all twenty spaces are filled with previous entries, CPU 14 deletes the first stored, or oldest, entry from RAM 16. This action creates a space so that the additional entry may be stored in RAM 16. If RAM 16 has at least one unoccupied space, no entries need be deleted. RAM 16 may be configured to include more or fewer memory locations for the history log depending on the requirements of PLC 10.

Next, CPU 14 opens 64 the history log and gathers information to update the history log. Particularly, prior to modifying the user program or as part of the request to modify the user program, the programmer sends a request to CPU 14 to add "revision information" to the history log. At this time, the operator will be requested to provide the information required to create an additional entry in the history log. The programmer will not, however, require the user to enter the history information. If the operator does not provide history log information, CPU 14 creates an 66 additional entry that is missing the information not supplied by the operator.

Using information from the programmer, CPU 14 transmits the additional entry to RAM 16 so that the additional entry is stored 68 in RAM 16. Specifically, the additional entry specific information related to the persons name or ID, time of change, type of change, program name, and comment fields is stored in the history log. After the additional entry has been stored in the history log, the history log is closed 70. CPU 14 then returns to detecting changes in the user program or the configuration of PLC 10.

With respect to changes in the I/O modules 24, CPU 14 monitors the hardware configuration of I/O modules 24 to detect a change 54. For example, if an additional I/O module 24 is installed in PLC 10, CPU 14 will detect 54 the address of the new I/O module 24. In one embodiment, the programmer, as described above, may be used to enter the "revision information" related to the modification of the hardware configuration.

The contents of the history log can be transmitted from CPU 14 to a display, for example to the programmer display, for review. In addition, the history log remains stored in RAM 16 regardless of the actions taken on the user program and the PLC configuration. Specifically, the history log remains stored in RAM 16 even if the user program and/or the hardware configuration are erased from RAM 16. In one embodiment, CPU 14 allows the history log to be erased from RAM 16 but only if a special password is transmitted to CPU 14. Upon receiving of the special password, CPU 14 deletes the contents of the history log contained in RAM 16.

By using the system described above, a revision history of the PLC user program and hardware configuration is provided. Additionally, the system maintains specific information related to the revisions.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for maintaining and updating a revision history in a programmable logic controller (PLC), the PLC having a central processing unit, a memory including a user program stored therein, and a hardware configuration including at least one input/output (I/O) module, said method comprising the steps of:

creating a history log in the PLC memory by:
accessing the PLC memory; and
opening the history log, the history log comprising a plurality of entries,
wherein each entry comprises the time of change and type of change;
detecting whether a change is being made to at least one of the user program stored in the PLC memory and the PLC hardware configuration; and if a change is detected, then selectively placing an entry in the history log.

2. A method in accordance with claim 1 wherein each entry of the history log further comprises the person's name or ID, the program name, and comment field information.

3. A method in accordance with claim 1 wherein the PLC memory comprises space for a history log having at least one entry, and wherein placing an entry into the history log comprises the steps of:

opening the history log;

detecting whether space is available to add an additional entry; and if space is available, then adding the additional entry to the history log.

4. A method in accordance with claim 3 wherein placing an entry into the history log further comprises the steps of:

if no space is available, then removing the oldest entry from the history log and adding the additional entry to the history log.

5. A method in accordance with claim 3 wherein the step of adding the additional entry to the history log comprises the step of incorporating information related to the persons name or ID, time of change, type of change, program name, and comment fields.

6. A method in accordance with claim 3 wherein the PLC memory comprises space for at least twenty entries.

7. A method in accordance with claim 1 wherein user program is stored in the PLC memory.

8. A method in accordance with claim 7 wherein the PLC memory comprises a random access memory and the user program is stored in the random access memory, and wherein the step of placing an entry into the history log comprises the steps of:

detecting whether a history log signal is present at the PLC; and if a history log signal is detected, then updating the history log.

9. A method in accordance with claim 8 wherein the step of updating the history log comprises the steps of:

accessing the PLC random access memory;

adding an entry to the history log; and closing the history log.

10. A system for maintaining a revision history, said system comprising a central processing unit, a memory, a user program stored in the memory, and a hardware configuration comprising at least one I/O module, said system configured to:

create a history log in the memory by:

accessing the memory; and opening the history log, wherein the history log comprises at least one entry that comprises the time of change and type of change;

detect whether a change is being made in at least one of the user program stored in the memory and the system hardware configuration; and if a change is detected, then selectively place an entry into the history log.

11. A system in accordance with claim 10 wherein the memory comprises space for a history log having at least one entry, and wherein to place an entry into the history log, said system is configured to:

open the history log;

detect whether space is available to add an additional entry; and if space is available, then add the additional entry to the history log.

12. A system in accordance with claim 11 wherein to place an entry into the history log, said system is further configured to:

if no space is available, then remove the oldest entry from the history log and add the additional entry to the history log.

13. A system in accordance with claim 11 wherein to add the additional entry to the history log, said system is configured to incorporate information related to the time of change and type of change.

14. A system in accordance with claim 11 wherein the memory comprises space for at least twenty entries.

15. A system in accordance with claim 10 wherein user program is stored in the PLC memory.

16. A system in accordance with claim 15 wherein the memory comprises a random access memory and the user program is stored in the random access memory, and wherein to place an entry into the history log said system is configured to:

detect whether a history log signal is present at the central processing unit; and if a history log signal is detected, then update the history log.

17. A system in accordance with claim 16 wherein to update the history log, said system is configured to:

access the random access memory;

add an entry to the history log; and close the history log.

* * * * *